United States Patent
Itay et al.

(10) Patent No.: US 8,195,236 B2
(45) Date of Patent: Jun. 5, 2012

(54) RETROFIT CONTACTLESS SMART SIM FUNCTIONALITY IN MOBILE COMMUNICATORS

(75) Inventors: Nehemya Itay, Beit Hillel (IL); Yaacov Haroosh, Migdal HaEmek (IL); Oded Bashan, Rosh Pina (IL)

(73) Assignee: On Track Innovations Ltd., Rosh Pina (IL)

( * ) Notice: Subject to any disclaimer, the term of this patent is extended or adjusted under 35 U.S.C. 154(b) by 171 days.

(21) Appl. No.: 12/816,669

(22) Filed: Jun. 16, 2010

(65) Prior Publication Data

US 2011/0312382 A1 Dec. 22, 2011

(51) Int. Cl.
*H04M 1/00* (2006.01)

(52) U.S. Cl. ....................................................... 455/558

(58) Field of Classification Search .......................... None
See application file for complete search history.

(56) References Cited

U.S. PATENT DOCUMENTS

| | | |
|---|---|---|
| 3,395,353 A | 7/1968 | King |
| 3,674,914 A | 7/1972 | Burr |
| 3,823,403 A | 7/1974 | Walter et al. |
| 3,981,076 A | 9/1976 | Nicolas et al. |
| 4,065,850 A | 1/1978 | Burr et al. |
| 4,417,413 A | 11/1983 | Hoppe et al. |
| 4,450,623 A | 5/1984 | Burr |
| 4,497,068 A | 1/1985 | Fischer |
| 4,776,509 A | 10/1988 | Pitts et al. |
| 4,857,760 A | 8/1989 | Stuebing |
| 4,951,044 A | 8/1990 | Nelson et al. |
| 5,025,550 A | 6/1991 | Zirbes et al. |
| 5,186,378 A | 2/1993 | Alfaro |
| 5,223,851 A | 6/1993 | Hadden et al. |
| 5,240,166 A | 8/1993 | Fontana et al. |
| 5,241,160 A | 8/1993 | Bashan et al. |
| 5,250,759 A | 10/1993 | Watson |
| 5,285,191 A | 2/1994 | Reeb |
| 5,349,173 A | 9/1994 | Scheckel et al. |
| 5,357,091 A | 10/1994 | Ozawa et al. |
| 5,378,857 A | 1/1995 | Swailes |
| 5,448,110 A | 9/1995 | Tuttle et al. |
| 5,539,188 A | 7/1996 | Fallah et al. |
| 5,572,410 A | 11/1996 | Gustafson |

(Continued)

FOREIGN PATENT DOCUMENTS

CN 101303746 11/2008

(Continued)

OTHER PUBLICATIONS

A Press Release by Zenius Solutions: "Zenius Solutions enables interactive NFC on current GSM phones", Oct. 19, 2009.

(Continued)

*Primary Examiner* — Ajit Patel
(74) *Attorney, Agent, or Firm* — Sughrue Mion, PLLC

(57) ABSTRACT

A mobile communicator including a main housing portion, defining a SIM card socket, a battery located at a battery location defined by the main housing portion, a cover over the battery and a retrofit contactless smart SIM functionality assembly, having a SIM card shaped portion which is mounted in the SIM card socket, a contactless smart card antenna portion located between the battery and the cover and an antenna tail portion which interconnects the contactless smart card antenna portion with the SIM card shaped portion, the antenna tail portion being attached and electrically connected to the SIM card shaped portion by means of an electrically conductive adhesive.

22 Claims, 2 Drawing Sheets

U.S. PATENT DOCUMENTS

| | | |
|---|---|---|
| 5,606,488 A | 2/1997 | Gustafson |
| 5,606,791 A | 3/1997 | Fougere et al. |
| 5,623,138 A | 4/1997 | Lee |
| 5,640,003 A | 6/1997 | Makino |
| 5,698,838 A | 12/1997 | Yamaguchi |
| 5,705,852 A | 1/1998 | Orihara et al. |
| 5,741,392 A | 4/1998 | Droz |
| 5,786,763 A | 7/1998 | Canipe |
| 5,801,372 A | 9/1998 | Yamaguchi |
| 5,809,633 A | 9/1998 | Mundigi et al. |
| 5,812,942 A | 9/1998 | Allen et al. |
| 5,815,020 A | 9/1998 | Allen et al. |
| 5,825,329 A | 10/1998 | Veghte et al. |
| 5,831,257 A | 11/1998 | Yamaguchi |
| 5,862,039 A | 1/1999 | Oertel |
| 5,864,126 A | 1/1999 | Hutton, Jr. |
| 5,874,725 A | 2/1999 | Yamaguchi |
| 5,978,655 A | 11/1999 | Ohura et al. |
| 6,021,951 A | 2/2000 | Nishikawa |
| 6,023,837 A | 2/2000 | Finn |
| 6,074,312 A | 6/2000 | Lyon et al. |
| RE36,769 E | 7/2000 | Ozawa et al. |
| 6,088,230 A | 7/2000 | Finn et al. |
| 6,161,762 A | 12/2000 | Bashan et al. |
| 6,202,927 B1 | 3/2001 | Bashan et al. |
| 6,209,592 B1 | 4/2001 | Gilboa et al. |
| 6,233,818 B1 | 5/2001 | Finn |
| 6,234,902 B1 | 5/2001 | Hazama |
| 6,329,139 B1 | 12/2001 | Nova et al. |
| 6,375,082 B1 | 4/2002 | Kobayashi et al. |
| 6,378,774 B1 | 4/2002 | Emori et al. |
| 6,445,743 B1 | 9/2002 | Arnold |
| 6,507,130 B1 | 1/2003 | Thuringer et al. |
| 6,517,000 B1 | 2/2003 | McAllister et al. |
| 6,533,178 B1 | 3/2003 | Gaul et al. |
| 6,600,420 B2 | 7/2003 | Goff et al. |
| 6,601,770 B1 | 8/2003 | Ikefuji et al. |
| 6,604,686 B1 | 8/2003 | Taban |
| 6,607,135 B1 | 8/2003 | Hirai et al. |
| 6,626,364 B2 | 9/2003 | Taban |
| 6,628,240 B2 | 9/2003 | Amadeo |
| 6,686,847 B1 | 2/2004 | Mittler |
| 6,698,089 B2 | 3/2004 | Finn et al. |
| 6,719,206 B1 | 4/2004 | Bashan et al. |
| 6,747,547 B2 | 6/2004 | Benson |
| 6,769,604 B2 | 8/2004 | Ichikawa et al. |
| 6,857,552 B2 | 2/2005 | Wong |
| 6,881,605 B2 | 4/2005 | Lee et al. |
| 6,883,103 B2 | 4/2005 | Thueringer et al. |
| 7,064,651 B2 | 6/2006 | Goetz |
| 7,075,434 B2 | 7/2006 | Shafir |
| 7,091,412 B2 | 8/2006 | Wang et al. |
| 7,162,302 B2 | 1/2007 | Wang et al. |
| 7,170,391 B2 | 1/2007 | Lane et al. |
| 7,183,929 B1 | 2/2007 | Antebi et al. |
| 7,198,199 B2 | 4/2007 | Ho |
| 7,204,427 B2 | 4/2007 | Patrice |
| 7,207,488 B2 | 4/2007 | Hammerslag et al. |
| 7,224,278 B2 | 5/2007 | Phaneuf et al. |
| 7,240,847 B2 | 7/2007 | Puschner et al. |
| 7,243,840 B2 | 7/2007 | Bason et al. |
| 7,260,221 B1 | 8/2007 | Atsmon |
| 7,269,021 B2 | 9/2007 | Gundlach et al. |
| 7,271,039 B2 | 9/2007 | Halope |
| 7,278,580 B2 | 10/2007 | Jones et al. |
| 7,280,970 B2 | 10/2007 | Tamir et al. |
| 7,334,735 B1 | 2/2008 | Antebi et al. |
| 7,383,297 B1 | 6/2008 | Atsmon et al. |
| 8,078,226 B2 * | 12/2011 | Lo et al. ......................... 455/558 |
| 2003/0085285 A1 | 5/2003 | Luu |
| 2003/0189095 A1 * | 10/2003 | Tuilier ............................ 235/435 |
| 2004/0245347 A1 | 12/2004 | Shibamoto et al. |
| 2005/0212690 A1 | 9/2005 | Nishikawa |
| 2006/0097870 A1 | 5/2006 | Choi et al. |
| 2006/0151614 A1 | 7/2006 | Nishizawa et al. |
| 2006/0175416 A1 | 8/2006 | Ho |
| 2006/0291483 A1 | 12/2006 | Sela |
| 2007/0085121 A1 | 4/2007 | Mikura et al. |
| 2007/0090387 A1 | 4/2007 | Daniels et al. |
| 2007/0215271 A1 | 9/2007 | McClintic |
| 2007/0235548 A1 | 10/2007 | Singleton |
| 2008/0076474 A1 | 3/2008 | Ho |
| 2008/0099559 A1 | 5/2008 | Lo et al. |
| 2008/0277483 A1 | 11/2008 | Ho |
| 2008/0297421 A1 | 12/2008 | Kriebel et al. |
| 2009/0005117 A1 | 1/2009 | Bashan et al. |
| 2009/0280757 A1 | 11/2009 | Zhu et al. |
| 2010/0022273 A1 * | 1/2010 | Patrice ........................... 455/558 |
| 2010/0200661 A1 | 8/2010 | Shafran et al. |
| 2011/0237190 A1 * | 9/2011 | Jolivet ........................... 455/41.2 |

FOREIGN PATENT DOCUMENTS

| | | |
|---|---|---|
| CN | 101520836 | 9/2009 |
| DE | 4410732 | 10/1995 |
| EP | 1914828 | 4/2008 |
| WO | WO 2005/104584 | 11/2005 |
| WO | WO 2006/052422 | 5/2006 |
| WO | WO 2007/080214 | 7/2007 |

OTHER PUBLICATIONS

Office Action dated Feb. 11, 2011, which issued during the prosecution of Applicant's U.S. Appl. No. 12/707,448.

Office Action dated Aug. 3, 2010, which issued during the prosecution of Applicant's U.S. Appl. No. 11/890,909.

Office Action dated Jan. 24, 2011, which issued during the prosecution of Applicant's U.S. Appl. No. 11/890,909.

R.S. Keogh, "Automated fabrication of high precision planar coils", Electrical Electronics Insulation, Conference, 1995 and Electrical Manufacturing & Coil Winding Conference, Proc. pp. 517-519, Sep. 18-21, 1995.

"Shrouds of Time, The history of RFID", An AIM Publication, Oct. 1, 2001.

* cited by examiner

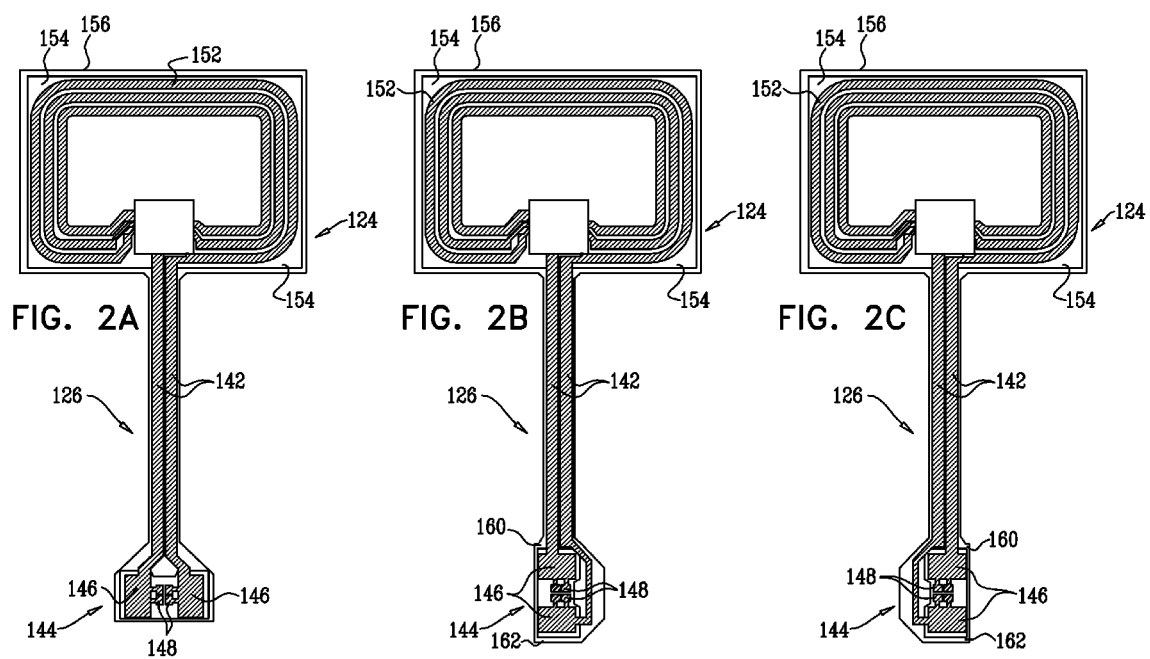

RETROFIT CONTACTLESS SMART SIM FUNCTIONALITY IN MOBILE COMMUNICATORS

FIELD OF THE INVENTION

The present invention relates to mobile communication devices having contactless smart card functionality generally, and more specifically to retrofit contactless smart SIM functionality assemblies for use with mobile communication devices.

BACKGROUND OF THE INVENTION

The following patent publications and articles are believed to represent the current state of the art:
U.S. Published Patent Application Nos. 2008/0076474 and 2008/0277483;
European Published Patent Application No. 1 914 828;
China Published Patent Application Nos. 101303746 and 101520836;
A press release by Zenius Solutions: "Zenius Solutions enables interactive NFC on current GSM phones", Oct. 19, 2009;
"Bladox Waver" by Bladox® (http://www.bladox.com); and "KingSub® duoPass®" by Taisys (http://www.taisys.com).

SUMMARY OF THE INVENTION

The present invention seeks to provide a mobile communicator having contactless smart card functionality and to retrofit contactless smart SIM functionality assemblies for use with mobile communication devices.

There is thus provided in accordance with a preferred embodiment of the present invention a mobile communicator including a main housing portion, defining a SIM card socket, a battery located at a battery location defined by the main housing portion, a cover over the battery and a retrofit contactless smart SIM functionality assembly, having a SIM card shaped portion which is mounted in the SIM card socket, a contactless smart card antenna portion located between the battery and the cover and an antenna tail portion which interconnects the contactless smart card antenna portion with the SIM card shaped portion, the antenna tail portion being attached and electrically connected to the SIM card shaped portion by means of an electrically conductive adhesive.

Preferably, the SIM card shaped portion includes a dual interface smartcard IC chip having contact and contactless data communications capabilities. Additionally, the SIM card shaped portion also includes an antenna connection region having a reduced thickness to accommodate an end of the antenna tail portion. Preferably, the mobile communicator also includes antenna contact pads located in the antenna connection region and connected to the IC chip. Preferably, the antenna contact pads are coupled to at least one capacitor, which enables more efficient resonance frequency tuning of the antenna portion.

In accordance with a preferred embodiment of the present invention, the antenna tail portion is formed on a flexible PCB substrate and includes at least two conductors which terminate at a connection end thereof in antenna connection pads. Preferably, the antenna connection pads are coupled to at least one capacitor, which enables more efficient resonance frequency tuning of the antenna portion.

Preferably, the antenna tail portion is attached and electrically connected to the SIM card shaped portion at the antenna connection region by means of an electrically conductive adhesive transfer tape. Additionally, the adhesive transfer tape adheres the connection end of the antenna tail portion to the antenna connection region of the SIM card shaped portion and electrically connects individual ones of the antenna connection pads of the antenna tail portion to corresponding ones of the antenna contact pads in the antenna connection region without creating a short circuit between the individual ones of the connection pads and without creating a short circuit between the individual ones of the contact pads. Additionally or alternatively, the adhesive transfer tape has anisotropic electrical conductivity and extends generally over the entire antenna connection region.

In accordance with a preferred embodiment of the present invention, the antenna portion includes an antenna coil, which is formed on a substrate formed of a flexible PCB substrate adhered to a layer of paramagnetic material.

There is also provided in accordance with another preferred embodiment of the present invention a retrofit contactless smart SIM functionality assembly, having a SIM card shaped portion which is adapted to be mounted in a SIM card socket of a mobile communicator, a contactless smart card antenna portion adapted to be located between a battery and a cover of the mobile communicator and an antenna tail portion which interconnects the contactless smart card antenna portion with the SIM card shaped portion, the antenna tail portion being attached and electrically connected to the SIM card shaped portion by means of an electrically conductive adhesive.

Preferably, the SIM card shaped portion includes a dual interface smartcard IC chip having contact and contactless data communications capabilities. Additionally, the SIM card shaped portion also includes an antenna connection region having a reduced thickness to accommodate an end of the antenna tail portion. Preferably, the retrofit contactless smart SIM functionality assembly also includes antenna contact pads located in the antenna connection region and connected to the IC chip. Preferably, the antenna contact pads are coupled to at least one capacitor, which enables more efficient resonance frequency tuning of the antenna portion.

In accordance with a preferred embodiment of the present invention, the antenna tail portion is formed on a flexible PCB substrate and includes at least two conductors which terminate at a connection end thereof in antenna connection pads. Preferably, the antenna connection pads are coupled to at least one capacitor, which enables more efficient resonance frequency tuning of the antenna portion.

Preferably, the antenna tail portion is attached and electrically connected to the SIM card shaped portion at the antenna connection region by means of an electrically conductive adhesive transfer tape. Additionally, the adhesive transfer tape adheres the connection end of the antenna tail portion to the antenna connection region of the SIM card shaped portion and electrically connects individual ones of the antenna connection pads of the antenna tail portion to corresponding ones of the antenna contact pads in the antenna connection region without creating a short circuit between the individual ones of the connection pads and without creating a short circuit between the individual ones of the contact pads. Additionally or alternatively, the adhesive transfer tape has anisotropic electrical conductivity and extends generally over the entire antenna connection region.

In accordance with a preferred embodiment of the present invention, the antenna portion includes an antenna coil, which is formed on a substrate formed of a flexible PCB substrate adhered to a layer of paramagnetic material.

BRIEF DESCRIPTION OF THE DRAWINGS

The present invention will be understood and appreciated more fully from the following detailed description, taken in conjunction with the drawings in which:

FIGS. 2A, 2B and 2C are simplified illustrations of three alternative embodiments of a contactless smart card antenna portion and an antenna tail portion of a retrofit contactless smart SIM functionality assembly for use with mobile communication devices.

DETAILED DESCRIPTION OF PREFERRED EMBODIMENTS

Figure 1:
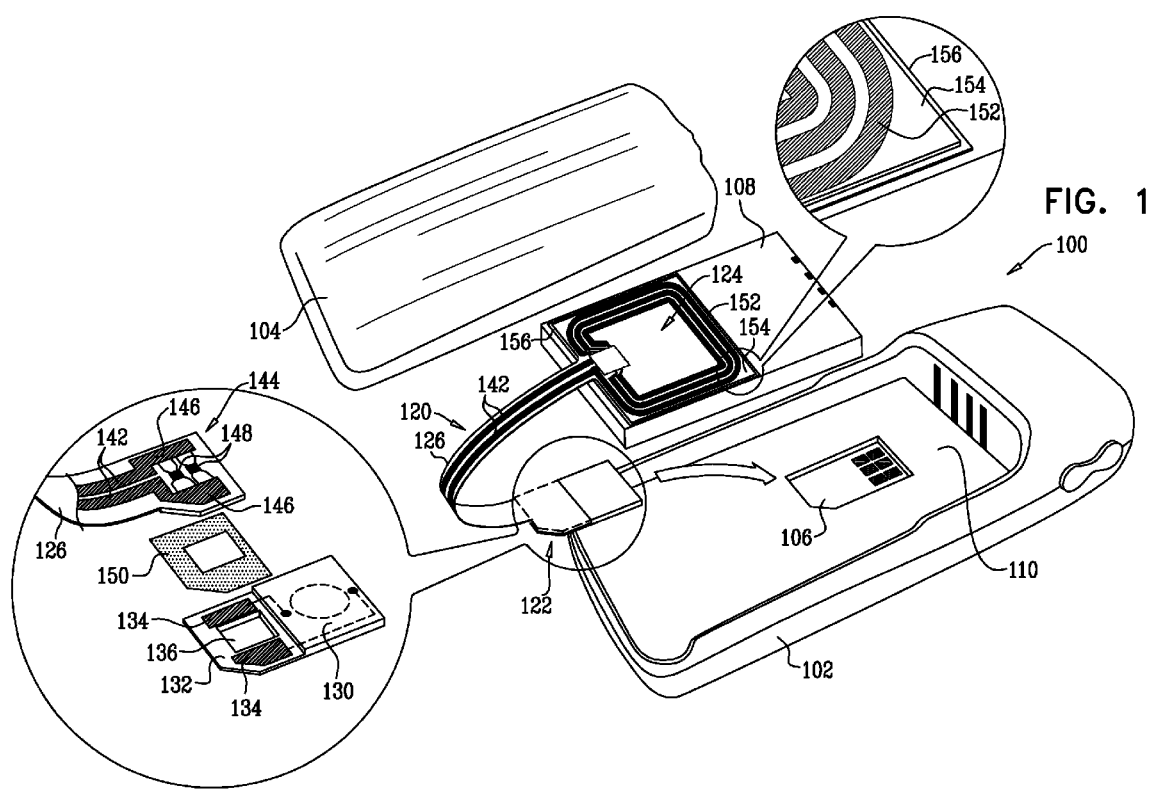
FIG. 1 is a simplified exploded-view illustration of a mobile communicator having contactless smart card functionality which is constructed and operative in accordance with an embodiment of the present invention.

Reference is now made to FIG. 1, which is a simplified partially pictorial, partially exploded-view illustration of a mobile communicator having contactless smart card functionality and which is constructed and operative in accordance with an embodiment of the present invention.

As seen in FIG. 1, there is provided a mobile communicator 100, preferably a mobile telephone, such as a cellular telephone, as shown, but alternatively any other suitable type of portable electronic device, such as a PDA, which includes a main housing portion 102, a removable cover 104 and a SIM card socket 106 located within main housing portion 102. A battery 108 is removably located at a battery location 110 defined by main housing portion 102, between the main housing portion 102 and the cover 104.

It is a particular feature of a preferred embodiment of the present invention that, instead of a conventional SIM card being mounted in SIM card socket 106, there is provided a retrofit contactless smart SIM functionality assembly 120, having a SIM card shaped portion 122 which is mounted in SIM card socket 106.

In accordance with a preferred embodiment of the present invention, retrofit contactless smart SIM functionality assembly 120 includes in addition to SIM card shaped portion 122, a contactless smart card antenna portion 124 and an antenna tail portion 126 which interconnects the contactless smart card antenna portion 124 with the SIM card shaped portion 122.

SIM card shaped portion 122 preferably includes a dual interface smartcard IC chip 130 having contact and contactless data communications capabilities as well as SIM functionality. Chip 130 may be a conventional chip such as an NXP SmartMX P5CD080. Alongside chip 130, SIM card shaped portion 122 preferably includes an antenna connection region 132 having a reduced thickness to accommodate an end of antenna tail portion 126. Antenna contact pads 134 are provided in antenna connection region 132 and are connected to chip 130. A cavity 136 is preferably formed in antenna connection region 132.

Antenna tail portion 126 is preferably formed on a conventional flexible PCB substrate, such as Polyamide or Polystyrene, and includes at least two conductors 142 which terminate, at a connection end 144 thereof, in antenna connection pads 146.

Antenna connection pads 146 are preferably coupled to capacitors 148, which enable more efficient resonance frequency tuning of the antenna portion 124. Capacitors 148 preferably are accommodated in cavity 136 in antenna connection region 132 of SIM card shaped portion 122. Alternatively, antenna contact pads 134 are galvanically connected to capacitors formed on chip 130.

It is a particular feature of the present invention that antenna tail portion 126 is attached and electrically connected to SIM card shaped portion 122 at antenna connection region 132 by means of an electrically conductive adhesive transfer tape 150, preferably a tape such as 3M Electrically Conductive Adhesive Transfer Tape 9705, which has anisotropic electrical conductivity. In this case, tape 150 adheres connection end 144 of antenna tail portion 126 to antenna connection region 132 of SIM card shaped portion 122 and electrically connects individual ones of antenna connection pads 146 of the antenna tail portion 126 to corresponding ones of antenna contact pads 134 in antenna connection region 132 without creating a short circuit between the individual ones of connection pads 146 or the individual ones of the contact pads 134, since the electrical conductivity of the tape 150 is only perpendicular to its physical extent.

Preferably, tape 150 extends generally over the entire antenna connection region 132. Alternatively, tape 150 extends only between each individual one of antenna connection pads 146 of the antenna tail portion 126 and each corresponding one of antenna contact pads 134 in antenna connection region 132, thereby obviating the need for the use of tape having anisotropic electrical conductivity without creating a short circuit between the individual ones of connection pads 146 or the individual ones of the contact pads 134.

Antenna portion 124 includes an antenna coil 152, which is preferably formed by conventional antenna forming techniques on a substrate 154, and is coupled via conductors 142 to antenna connection pads 146. The substrate 154 is preferably formed of a conventional flexible PCB substrate, such as Polyamide or Polystyrene, and is preferably adhered to a layer of paramagnetic material 156, such as ferrite.

Electric current is induced in the antenna coil 152 by a magnetic field generated by a reader (not shown). The layer of paramagnetic material 156 mostly insulates the magnetic field from the battery 108 and from metallic elements of the mobile communicator 100, thereby preventing the magnetic field from being significantly dampened by otherwise mostly passing through the battery 108 and through metallic elements of the mobile communicator 100.

As seen in FIG. 1, when the retrofit contactless smart SIM functionality assembly 120 is installed in a mobile communicator 100, the antenna portion 124 is located between battery 108 and cover 104 and SIM card shaped portion 122 is mounted in SIM card socket 106.

It is appreciated that the SIM card socket 106 is located in different locations and orientations in various models and types of mobile communicators. The present invention is not limited to any given model or type of mobile communicator.

Reference is now made to FIGS. 2A, 2B and 2C, which are simplified illustrations of three alternative embodiments of the contactless smart card antenna portion 124 and the antenna tail portion 126 of the retrofit contactless smart SIM functionality assembly 120 for use with different mobile communication devices. For example, the embodiment of FIG. 2A is suitable for use with a Nokia 5700 Xpress Music, a Sony Ericsson W850I, a Nokia N72 or a Nokia N5700, the embodiment of FIG. 2B is suitable for use with a Sony Ericsson W850I or a Nokia N95, and the embodiment of FIG. 2C is suitable for use with a Sony Ericsson W850I.

As seen in FIGS. 2A, 2B and 2C and as noted hereinabove, retrofit contactless smart SIM functionality assembly 120 includes a contactless smart card antenna portion 124 and an antenna tail portion 126 which interconnects the contactless smart card antenna portion 124 with the SIM card shaped portion 122 of retrofit contactless smart SIM functionality assembly 120 forming part of the mobile communicator of FIG. 1.

Antenna tail portion 126 is preferably formed on a conventional flexible PCB substrate, such as Polyamide or Polystyrene and includes at least two conductors 142 which terminate at a connection end 144 thereof in antenna connection pads 146 and are preferably coupled to capacitors 148, which enable more efficient resonance frequency tuning of the antenna portion 124.

Antenna portion 124 includes an antenna coil 152, which is preferably formed by conventional antenna forming techniques on a substrate 154, and is coupled via conductors 142 to antenna connection pads 146. The substrate 154 is preferably formed of a conventional flexible PCB substrate, such as Polyamide or Polystyrene, and is preferably adhered to a layer of paramagnetic material 156, such as ferrite.

As seen in FIG. 2A, connection end 144 is symmetric about a longitudinal axis defined by antenna tail portion 126, whereby antenna connection pads 146 are positioned on either side thereof, and the capacitors 148 are positioned between the antenna connection pads 146 and are connected thereto.

As seen in FIG. 2B, antenna connection pads 146 are positioned on connection end 144 in a longitudinal series along a longitudinal axis defined by antenna tail portion 126, whereby a first of the at least two conductors 142 terminates at a first of the antenna connection pads 146 which is positioned at a first end 160 of connection end 144 adjacent to tail portion 126, and a second of the at least two conductors 142 extends clockwise around the first of antenna connection pads 146 and terminates at a second of the antenna connection pads 146 which is positioned at a second end 162 of connection end 144, whereby the capacitors 148 are positioned between the antenna connection pads 146 and are connected thereto.

As seen in FIG. 2C, antenna connection pads 146 are positioned on connection end 144 in a longitudinal series along a longitudinal axis defined by antenna tail portion 126, whereby a first of the at least two conductors 142 terminates at a first of the antenna connection pads 146 which is positioned at a first end 160 of connection end 144 adjacent to tail portion 126, and a second of the at least two conductors 142 extends counterclockwise around the first of antenna connection pads 146 and terminates at a second of the antenna connection pads 146 which is positioned at a second end 162 of connection end 144, whereby the capacitors 148 are positioned between the antenna connection pads 146 and are connected thereto.

It will be appreciated by persons skilled in the art that the present invention is not limited by what has been particularly shown and described hereinabove. Rather the scope of the present invention includes combinations and subcombinations of various features described hereinabove as well as variations and modifications thereof which would occur to persons reading the foregoing and which are not in the prior art.

The invention claimed is:

1. A mobile communicator comprising:
a main housing portion, defining a SIM card socket;
a battery located at a battery location defined by said main housing portion;
a cover over said battery; and
a retrofit contactless smart SIM functionality assembly, having a SIM card shaped portion which is mounted in said SIM card socket, a contactless smart card antenna portion located between said battery and said cover and an antenna tail portion which interconnects said contactless smart card antenna portion with said SIM card shaped portion, said antenna tail portion being attached and electrically connected to said SIM card shaped portion by means of an electrically conductive adhesive.

2. A mobile communicator according to claim 1 and wherein said SIM card shaped portion includes a dual interface smartcard IC chip having contact and contactless data communications capabilities.

3. A mobile communicator according to claim 2 and wherein said SIM card shaped portion also includes an antenna connection region having a reduced thickness to accommodate an end of said antenna tail portion.

4. A mobile communicator according to claim 3 and also comprising antenna contact pads located in said antenna connection region and connected to said IC chip.

5. A mobile communicator according to claim 4 and wherein said antenna contact pads are coupled to at least one capacitor, which enables more efficient resonance frequency tuning of said antenna portion.

6. A mobile communicator according to claim 4 and wherein said antenna tail portion is formed on a flexible PCB substrate and includes at least two conductors which terminate at a connection end thereof in antenna connection pads.

7. A mobile communicator according to claim 6 and wherein said antenna connection pads are coupled to at least one capacitor, which enables more efficient resonance frequency tuning of said antenna portion.

8. A mobile communicator according to claim 6 and wherein said antenna tail portion is attached and electrically connected to said SIM card shaped portion at said antenna connection region by means of an electrically conductive adhesive transfer tape.

9. A mobile communicator according to claim 8 and wherein said adhesive transfer tape adheres said connection end of said antenna tail portion to said antenna connection region of said SIM card shaped portion and electrically connects individual ones of said antenna connection pads of said antenna tail portion to corresponding ones of said antenna contact pads in said antenna connection region without creating a short circuit between the individual ones of the connection pads and without creating a short circuit between the individual ones of the contact pads.

10. A mobile communicator according to claim 8 and wherein said adhesive transfer tape has anisotropic electrical conductivity and extends generally over the entire antenna connection region.

11. A mobile communicator according to claim 1 and wherein said antenna portion includes an antenna coil, which is formed on a substrate formed of a flexible PCB substrate adhered to a layer of paramagnetic material.

12. A retrofit contactless smart SIM functionality assembly, having a SIM card shaped portion which is adapted to be mounted in a SIM card socket of a mobile communicator, a contactless smart card antenna portion adapted to be located between a battery and a cover of said mobile communicator and an antenna tail portion which interconnects said contactless smart card antenna portion with the SIM card shaped portion, said antenna tail portion being attached and electrically connected to said SIM card shaped portion by means of an electrically conductive adhesive.

13. A retrofit contactless smart SIM functionality assembly according to claim 12 and wherein said SIM card shaped portion includes a dual interface smartcard IC chip having contact and contactless data communications capabilities.

14. A retrofit contactless smart SIM functionality assembly according to claim 13 and wherein said SIM card shaped portion also includes an antenna connection region having a reduced thickness to accommodate an end of said antenna tail portion.

15. A retrofit contactless smart SIM functionality assembly according to claim 14 and also comprising antenna contact pads located in said antenna connection region and connected to said IC chip.

16. A retrofit contactless smart SIM functionality assembly according to claim 15 and wherein said antenna contact pads are coupled to at least one capacitor, which enables more efficient resonance frequency tuning of said antenna portion.

17. A retrofit contactless smart SIM functionality assembly according to claim 15 and wherein said antenna tail portion is formed on a flexible PCB substrate and includes at least two conductors which terminate at a connection end thereof in antenna connection pads.

18. A retrofit contactless smart SIM functionality assembly according to claim 17 and wherein said antenna connection pads are coupled to at least one capacitor, which enables more efficient resonance frequency tuning of said antenna portion.

19. A retrofit contactless smart SIM functionality assembly according to claim 17 and wherein said antenna tail portion is attached and electrically connected to said SIM card shaped portion at said antenna connection region by means of an electrically conductive adhesive transfer tape.

20. A retrofit contactless smart SIM functionality assembly according to claim 19 and wherein said adhesive transfer tape adheres said connection end of said antenna tail portion to said antenna connection region of said SIM card shaped portion and electrically connects individual ones of said antenna connection pads of said antenna tail portion to corresponding ones of said antenna contact pads in said antenna connection region without creating a short circuit between the individual ones of the connection pads and without creating a short circuit between the individual ones of the contact pads.

21. A retrofit contactless smart SIM functionality assembly according to claim 19 and wherein said adhesive transfer tape has anisotropic electrical conductivity and extends generally over the entire antenna connection region.

22. A retrofit contactless smart SIM functionality assembly according to claim 12 and wherein said antenna portion includes an antenna coil, which is formed on a substrate formed of a flexible PCB substrate adhered to a layer of paramagnetic material.

\* \* \* \* \*